(12) United States Patent　(10) Patent No.: US 8,914,862 B2
Rodriguez et al.　(45) Date of Patent: Dec. 16, 2014

(54) CLOUD IDENTIFICATION PROCESSING AND VERIFICATION

(71) Applicant: Delfigo Corporation, Boston, MA (US)

(72) Inventors: Raphael A. Rodriguez, Quincy, MA (US); Julian D. Spring, Brighton, MA (US); Daniel Volovik, Brighton, MA (US)

(73) Assignee: Delfigo Corporation, Boston, MA (US)

( * ) Notice: Subject to any disclaimer, the term of this patent is extended or adjusted under 35 U.S.C. 154(b) by 109 days.

(21) Appl. No.: 13/772,768

(22) Filed: Feb. 21, 2013

(65) Prior Publication Data

US 2013/0167216 A1　Jun. 27, 2013

Related U.S. Application Data

(63) Continuation of application No. 13/222,468, filed on Aug. 31, 2011, now Pat. No. 8,407,774.

(51) Int. Cl.
　*G06F 7/04*　(2006.01)
　*G06F 21/31*　(2013.01)
　*H04L 29/06*　(2006.01)
(52) U.S. Cl.
　CPC .............. *G06F 21/316* (2013.01); *H04L 63/08* (2013.01)
　USPC ............................................................ 726/7

(58) Field of Classification Search
　None
　See application file for complete search history.

(56) References Cited

U.S. PATENT DOCUMENTS

| 8,407,774 | B2 | 3/2013 | Rodriguez et al. | |
| 2004/0187037 | A1* | 9/2004 | Checco | 713/202 |
| 2009/0150992 | A1* | 6/2009 | Kellas-Dicks et al. | 726/19 |

* cited by examiner

*Primary Examiner* — Brandon Hoffman

(74) *Attorney, Agent, or Firm* — Maine Cernota & Rardin

(57) ABSTRACT

A system and method are provided for identification of a user collecting enrollment data from the user including dwell times for each of an enrollment series of login attempts; creating an iterative unified identification score for the user from the dwell times of login attempts; establishing an iterative average of identification score; establishing a standard deviation of the iterative identification score; deleting the dwell times and other data of the enrollment series of login attempts; prompting and collecting login specific dwell times; calculating a login identification score; comparing the login identification score to the iterative unified identification score, and updating the iterative scores and the iterative standard deviations and storing between login attempts only an iterative average dwell time, an iterative average flight time, the unified identification score and iterative standard deviation of the unified identification score.

10 Claims, 4 Drawing Sheets

CLOUD IDENTIFICATION PROCESSING AND VERIFICATION

RELATED APPLICATIONS

This application is a continuation of U.S. application Ser. No. 13/222,468, filed Aug. 31, 2011, now issued as U.S. Pat. No. 8,407,774 B2, on Mar. 26, 2013. This application is herein incorporated by reference in its entirety for all purposes.

FIELD OF THE INVENTION

The invention relates to user access and authentication, and more particularly, to a system for authentication of a user during login to a computer system, device or smartphone.

BACKGROUND OF THE INVENTION

Known systems for identification of a user include the use of personal behavior. Information about the user's physiology may be collected, including flight time between keys, key dwell duration, as well as data relating to geographical location, IP address, and other information indicative of the hardware, software and communication protocols through which the system, device or smartphone is accessed. Notably, known systems collect such data in tables, which are periodically updated, thereby refining the dataset and improving the accuracy of identification with successive iterations.

With the growth of cloud computing and other high user count systems, which could be in the hundreds of millions or billions using systems from companies such as Facebook, Google and Twitter, storing a statistically significant sample of logins for comparison when multiplied by the increased number of users results in huge drains on processing resources, related to CPU, memory, bus circuit board speed, and data storage.

What is needed, therefore, are techniques for efficiently confirming identity of users logging into a system.

SUMMARY OF THE INVENTION

One embodiment of the present invention provides a system for the identification of users, the system comprising: an enrollment processor, whereby initial login attempts by the user are measured, and data identifying the user are collected for a specific device and location; the enrollment processor being configured to collect the identifying data and create a first login score, an iterative average login score, and an iterative standard deviation of the login score; an enrolled login processor, the enrolled login processor being configured to measure dwell time on keys in a login sequence and to calculate weighted dwell time from the dwell time; a login score calculator, the calculator taking the weighted dwell time and generating an actual login score; a login confidence comparator, the login confidence comparator comprising a processor whereby a comparison score is generated as a function of the actual login score, the iterative average login score, and the iterative standard deviation of the login score.

Another embodiment of the claimed invention provides such a system wherein the enrolled login processor is further configured to measure flight time between the keys in the login sequence and to calculate weighted flight time from the flight time; and wherein the login score calculator is configured to take the weighted flight time and the weighted dwell time to generate an actual login score.

A further embodiment of the present invention provides such a system further comprising an updater, whereby the iterative average login score and iterative standard deviation are updated after each login, and data used in calculating the login score is deleted.

Yet another embodiment of the present invention provides such a system wherein the confidence login generator identifies login attempts exceeding a desired degree of identity confidence and allows access to users making the login attempt.

A yet further embodiment of the present invention provides such a system wherein the weighted flight time is $y_i$ where $W_f$ is a flight time weight, $f_i$ is a flight time for the $i^{th}$ key, $\bar{f}_i$ is an average flight time for the $i^{th}$ key, $\sigma_{f_i}$ is the standard deviation of $f_i$ and $$y_i = \text{Minimum}\left[W_f \frac{|f_i - \bar{f}_i|}{\sigma_{f_i}}, 1\right].$$

Even another embodiment of the present invention provides such a system wherein the weighted dwell time is $x_i$ where $W_d$ is a dwell time weight, $d_i$ is a dwell time for the $i^{th}$ key, $\bar{d}_i$ is an average dwell time for the $i^{th}$ key, $\sigma_{d_i}$ is the standard deviation of $d_i$ and $$x_i = \text{Minimum}\left[W_d \frac{|d_i - \bar{d}_i|}{\sigma_{d_i}}, 1\right].$$

An even further embodiment of the present invention provides such a system wherein $W_d=0.20$.

Still yet another embodiment of the present invention provides such a system wherein the actual login score is S wherein $$S = \sum_{i=1}^{k} x_i + \sum_{i=1}^{k-1} y_i$$

wherein $x_i$ is a dwell time score for an $i^{th}$ key and $y_i$ is a flight time for an $i^{th}$ key, and k is the number of keystrokes entered.

A still yet further embodiment of the present invention provides such a system wherein the comparison score is Z wherein $\bar{S}$ is an average S and $\sigma_s$ is a standard deviation of S and $$Z = \frac{S - \bar{S}}{\sigma_s}.$$

One embodiment of the present invention provides a method for the verification of a user of a system, the method comprising: collecting enrollment data from the user including dwell times for each of an enrollment series of login attempts; creating an iterative unified identification score for the user from the dwell times of the enrollment series of login attempts; establishing an iterative average of the iterative unified identification score; establishing an iterative standard deviation of the iterative unified identification score; deleting the dwell times of the enrollment series of login attempts; prompting the user to login and collecting login specific dwell times; calculating a login identification score from the login specific dwell times; comparing the login identification score to the iterative unified identification score, and if the login identification score is consistent with the iterative unified identification score allowing access to the user; and updating the iterative unified identification score, the iterative average of the unified identification score and the iterative standard deviation of the unified identification score.

Another embodiment of the present invention provides such a method further comprising: collecting flight times for each of the enrollment series of login attempts wherein the creating the iterative unified identification login score uses the flight time of the enrollment series of the login attempts; deleting the flight time of the enrollment series of login attempts.

A further embodiment of the present invention provides such a method further comprising calculating averages and standard deviations of the dwell time for each of an enrollment series of login attempts.

Yet another embodiment of the present invention provides such a method wherein the first unified identification score is a function of the averages and standard deviations of the dwell time for each of an enrollment series of login attempts.

A yet further embodiment of the present invention provides such a method wherein the login identification score is a function of the login specific dwell times.

Even another embodiment of the present invention provides such a method wherein the comparing the login identification score to the iterative unified identification score comprises calculating a confidence score, the confidence score being a function of the login identification score, the average of the login identification scores and the standard deviation of the login identification scores.

An even further embodiment of the present invention provides such a method wherein the collecting enrollment data comprises prompting a user for a series of calibration login attempts, detecting flight and dwell times, from the series of calibration login attempts, calculating starting average dwell times, starting average flight times, starting standard deviation dwell times, and starting standard deviation flight times.

Still another embodiment of the present invention provides such a method wherein the iterative unified identification score is first calculated from the starting average dwell times, starting average flight times, starting standard deviation dwell times, and starting standard deviation flight times.

A still further embodiment of the present invention provides such a method wherein the iterative unified identification score is calculated from a series of identification scores derived from score enrollment login attempts following the calibration login attempts.

Still even another embodiment of the present invention provides such a method wherein the score enrollment login attempts comprise at least three score enrollment login attempts.

One embodiment of the present invention provides a method of identifying a user, the method comprising: identifying if the user is enrolled; if the user is not enrolled, enrolling the user by prompting the user to enter a system access credential, updating a login count, and collecting dwell and flight time data over a plurality of calibration entries, using the calibration entries to calculate starting averages and standard deviations of the dwell and flight time data, deleting the dwell and flight time data; prompting the user to enter a series of score calculation entries and updating the login count; collecting dwell and flight time data from each score calculation entry in the series of score calculation entries; calculating an identification score for each entry of the series of score calculation entries from the dwell and flight time data of each the score calculation entry; calculating an rolling average and rolling standard deviation of the identification scores and updating the averages and standard deviations of the dwell and flight time data with the dwell and flight time data of each the score calculation entry to create rolling average dwell and flight times and rolling standard deviations of dwell and flight times; if the user is enrolled, prompting the user for the system access credential in an access login attempt; collecting dwell and flight time data of the access login attempt; calculating the identification score from the dwell and flight time data from the access login attempt, the rolling average dwell time, the rolling average flight time, the rolling standard deviation dwell time and the rolling standard deviation flight time; comparing the identification score to the rolling average identification score and the rolling standard deviation identification score, if identification score is within preset parameters, allowing access to the system, updating the rolling average dwell time, the rolling average flight time, the rolling average identification score, the rolling standard deviation dwell time, the rolling standard deviation flight time, the login count, and the standard deviation identification score.

One embodiment of the present invention provides a method for the identification of a user, comprising: generating an identification score based on dwell time of a login attempt; comparing the identification score against a stored average identification score and a standard deviation identification score.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
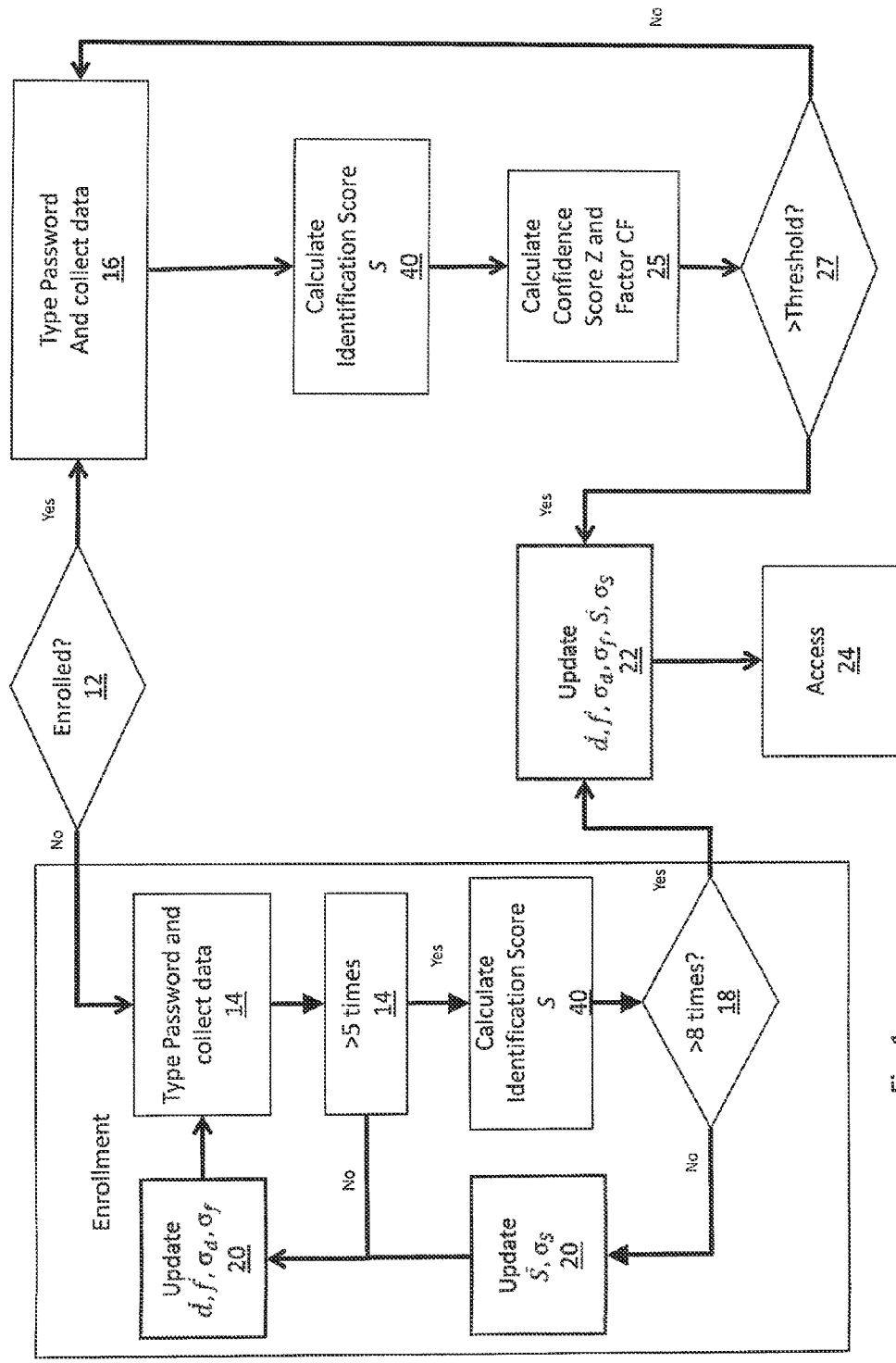
FIG. 1 is a block diagram illustrating a user verification system configured in accordance with one embodiment of the present invention.

In one embodiment of the present invention, illustrated in FIG. 1, a system is provided for the identification of a user. Users are divided between those for whom enrollment has already been achieved, and those who are as yet unenrolled 12. In such a system, users of each type are prompted to type a password, PIN, or other identification sequence 14, 16. Data for both groups of users related to the user's input of system access credentials such as a password, passcode, username, PIN and other system access credentials known to one skilled in the art is collected herein referred to as "password". Data collected includes time duration of each key stroke, known as dwell time, time duration between key strokes of particular alpha numeric letter, character, and symbol combinations known as key to key flight time. One skilled in the art will appreciate that "key strokes" as used in this application include touch events on touch screen and mobile devices as well as physical keyboards.

In one embodiment, dwell time may be the only characteristic considered, in which case the system may not measure flight time, or set the weighted flight time to zero.

For unenrolled users, upon entry of the password 14, the system checks to see if the user has accessed the system for at least a predetermined number of times 18, in one embodiment 8 times. In other embodiments different numbers of iterations may be utilized. If the system has not been accessed by the user for the predetermined number of times, the data is updated 20, as described in the context of FIG. 2, in a single pass and the user is prompted to repeat the password. This repeats until the predetermined number is reached. The enrollment process allows the system to acquire a statistically significant data set with which to compare subsequent logins. After adequate data has been collected to create a sample for comparison, the user is allowed to proceed, the comparison data is updated 22 as described in the context of FIG. 3 and the user is allowed access 24.

Where the user has already been enrolled, the entry of the password 16 prompts the calculation of a confidence factor 26. Calculation of the confidence factor 25 is explained in greater detail with regard to FIG. 4. If the confidence factor 25 exceeds a predefined threshold number 27, the data set is updated 22 and the user is allowed access 24. Both dwell times and flight times may be transformed in units of standard deviation 32, 34. Dwell time 26 is the duration of time spent by the user on a particular key or keys, or device input known to one skilled in the art, while flight time 28 is the time spent by the user between key strokes or inputs. In one embodiment, the embodiment confidence factors may, by means of arbitrary constants, be set to fall within a range of 0 to 100, with a pass threshold arbitrarily set by the system administrator or automated based on workflow rules which are preset or dynamic in relationship to the data, whether individual, group or global dataset. One skilled in the art will appreciate that the confidence factor threshold may be set for a system, and is dependent not just on the degree of certitude desired, but also on the weight assigned to different data points and attributes collected.

Figure 2:
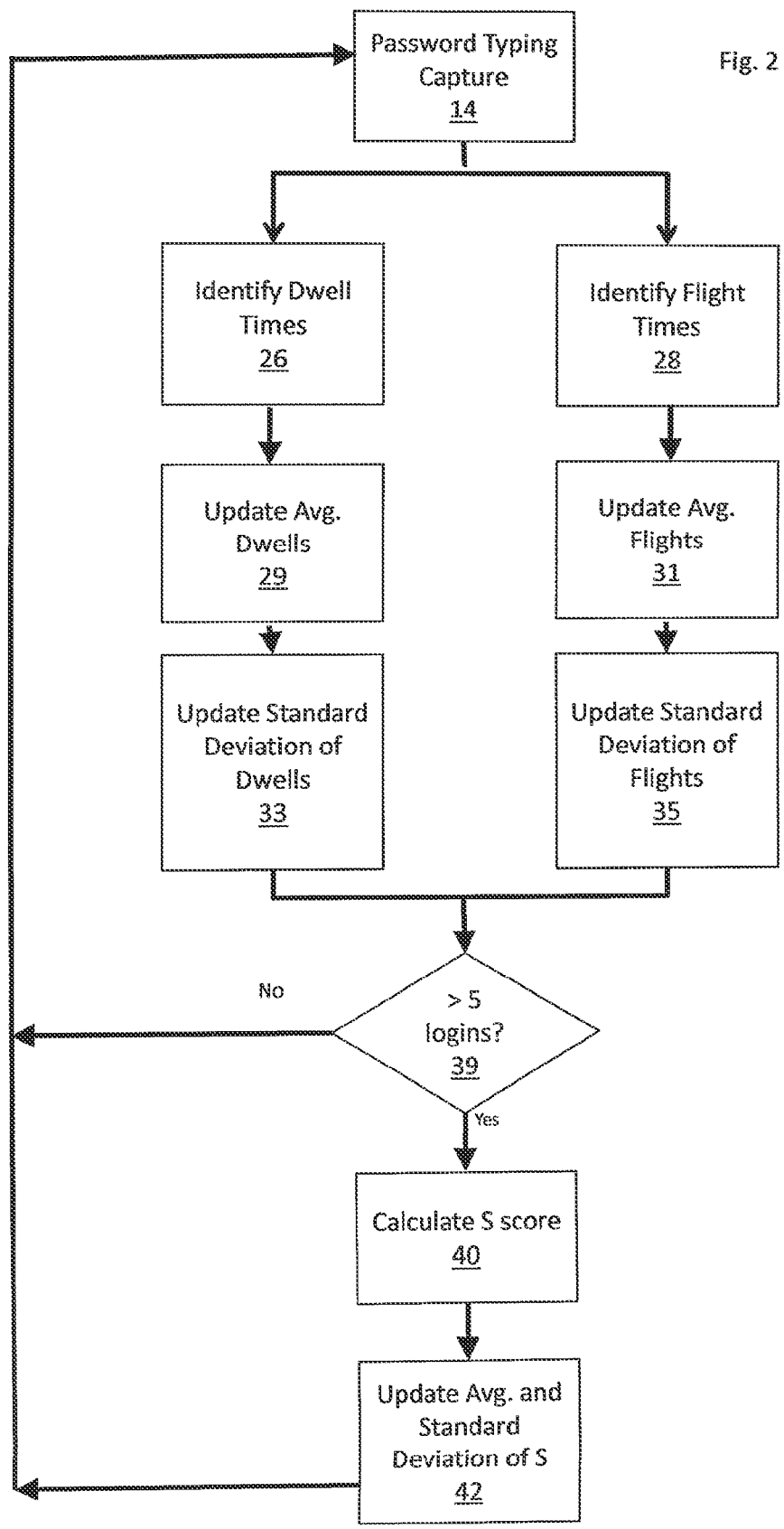
FIG. 2 is a block diagram illustrating a user enrollment component in a user verification system configured in accordance with one embodiment of the present invention.

In one enrollment embodiment, illustrated in FIG. 2, enrollment consists of 8 logins before the first confidence factor is calculated. In such an embodiment, at least the first 3 login attempts, but in some embodiments first 5 logins are only used to calculate $\bar{d}_i$, $\bar{f}_i$, $\sigma_{d_i}$, and $\sigma_{f_i}$. In embodiments with 5 initial data collection logins, after those five logins, logins numbers 6-8 are used to update $\bar{d}_i$, $\bar{f}_i$, $\sigma_{d_i}$, and $\sigma_{f_i}$ as well as to calculate:

$$x_i = \text{Minimum}\left[W_d \frac{|d_i - \bar{d}_i|}{\sigma_{d_i}}, 1\right]$$

and $$y_i = \text{Minimum}\left[W_f \frac{|f_i - \bar{f}_i|}{\sigma_{f_i}}, 1\right]$$

where $d_i$ and $f_i$ are the $i^{th}$ dwell and flight time respectively. Then the S score is calculated by $$S = \sum_{i=1}^{k} x_i + \sum_{i=1}^{k-1} y_i.$$

The first S score calculated (after the sixth login) is the starting value for $\bar{S}$. Then the S scores from logins 7-8 are used to update $\bar{S}$ where $$\bar{S}_{new} = \bar{S}_{old} + \frac{S - \bar{S}_{old}}{N_r - 5}$$

and find $\sigma_S$, to be used during the actual login process to calculate confidence factors. One skilled in the art would appreciate that more sampling iterations will improve accuracy, however, excessive iterations will inconvenience users. At this point the enrollment is over. In such an embodiment, there is no need to store a login pattern once that pattern has been used to update the relevant statistics. One skilled in the art will likewise appreciate that other scoring formulae are known which may be used to generate scores.

In an alternative embodiment the updating of a data set for a newly enrolled user comprises collection of various data including dwell times 26 and flight times 28. These factors are used to update average dwell times 29 and average flight times 31, and standard deviations of dwell times 33 and flight times 35. The process is repeated until, in one embodiment, a number of login attempts that is either statically pre-determined, or dynamically determined based on an external set of rules 39 have been made, thereby capturing sufficient data as to the users characteristic dwell time and flight time for a particular password on a particular machine. After the number of enrollment logins have been completed, the system calculates a score (S) for each login 40. The scores provide a measure of the degree of consistency of a particular login attempt in comparison to the average login for that user. Averages of the scores and standard deviation of the scores are then updated and stored 42 for future use. In those embodiments where it has not already been deleted, the data from which the S score is generated, i.e. the stored patterns of the initial login attempts is deleted, and the stored average and standard deviation Scores are retained.

Figure 4:
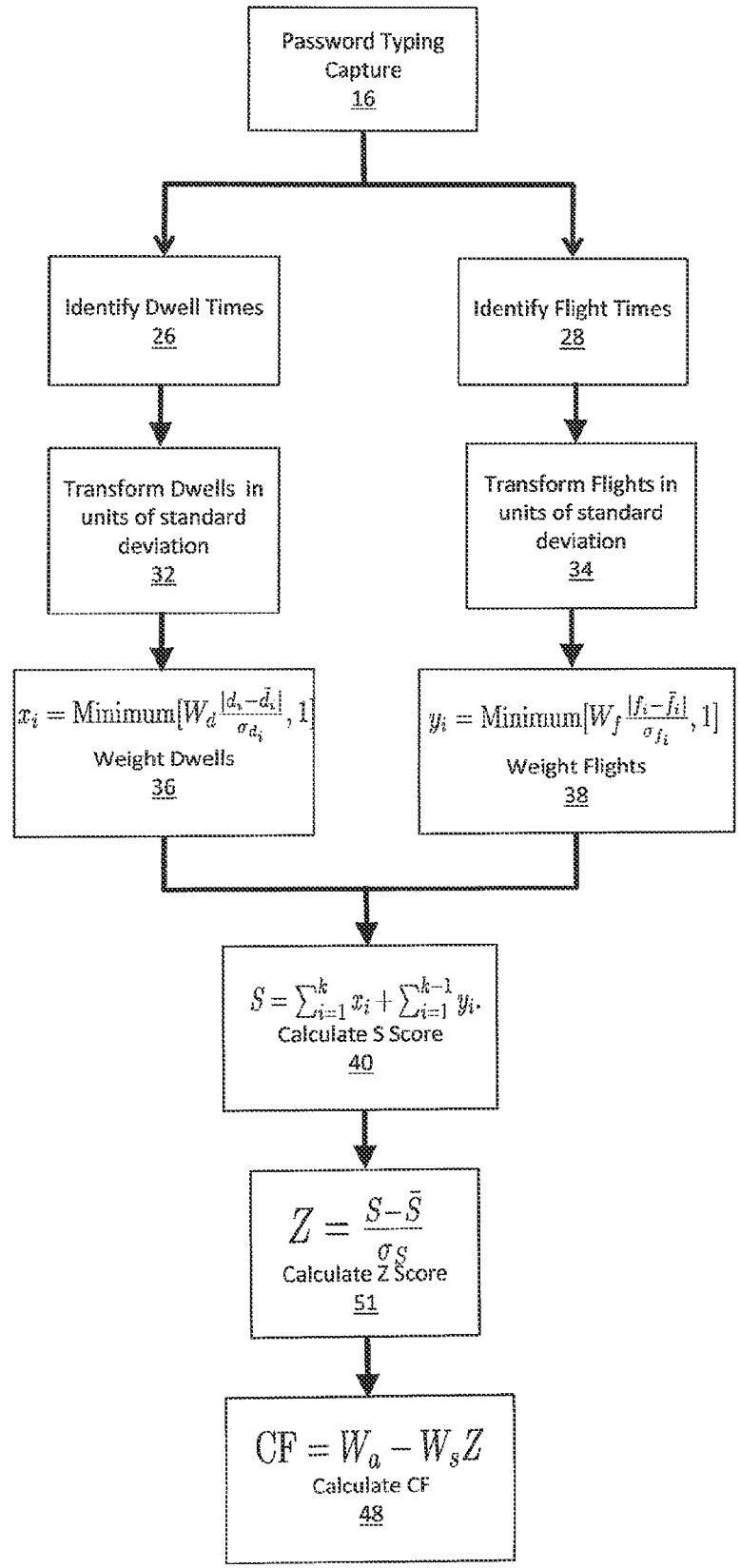
FIG. 4 is a block diagram illustrating a confidence factor calculator in a user verification system configured in accordance with one embodiment of the present invention.

In one embodiment, illustrated in FIG. 4, confidence factors for enrolled users are calculated. The password is typed 16 as in the enrollment process of FIG. 2, and both dwell times 26 and flight times 28 are measured. The standard deviation of the dwell time 33 and the flight time 35 are calculated. From the dwell time 26 and the flight time 28 and their respective standard deviations 33, 35 the weighted Dwells 36 and weighted Flights 38 are calculated. The sums of the weighted values are then used to calculate a score S 40. The score S 40 then forms the basis for calculation 51 of another score, a confidence score, Z, score Z being the difference between the score S and the average of scores S stored in the enrollment process and subsequently updated, divided by the standard Deviation of S, again drawn from stored values 42. In one embodiment this Z score can be converted 48 to a confidence factor CF as discussed above.

Figure 3:
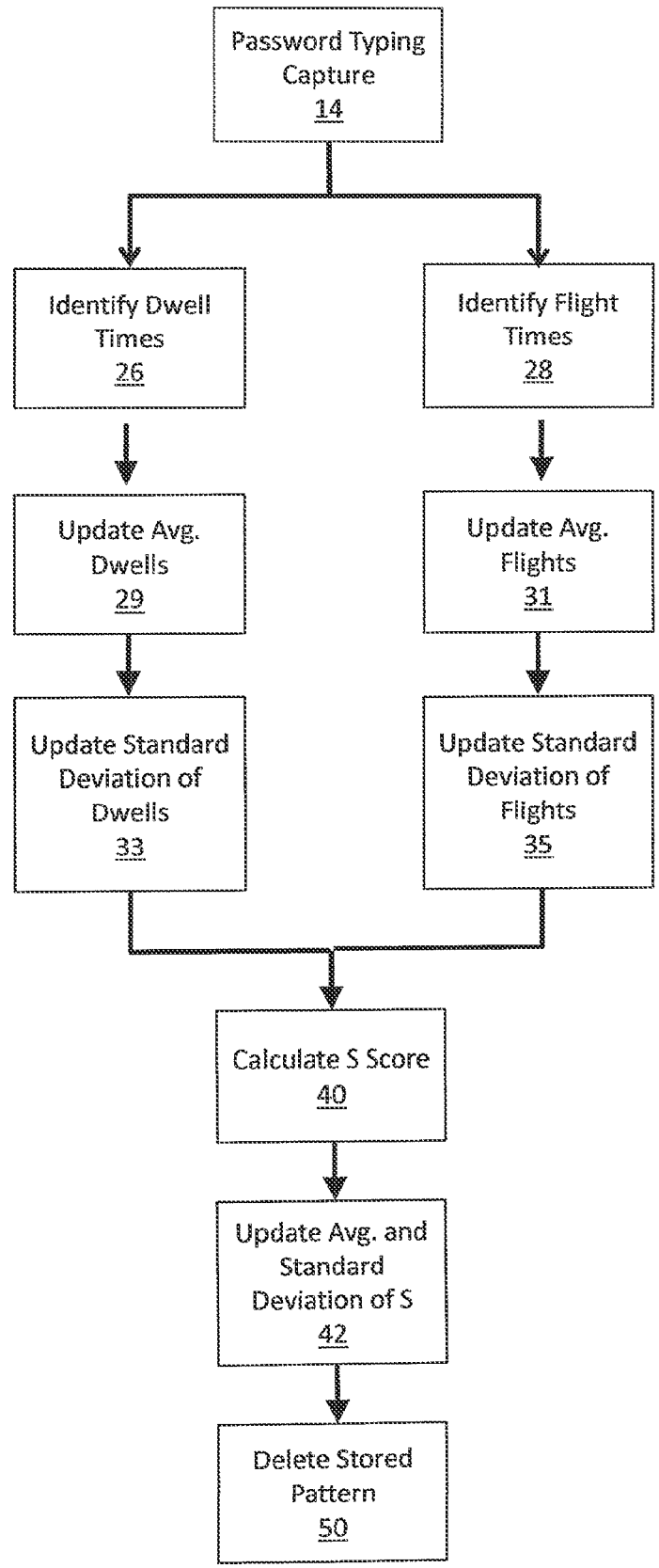
FIG. 3 is a block diagram illustrating a user data updating and storage component in a user verification system configured in accordance with one embodiment of the present invention.

As illustrated in FIG. 3, updating of the average and standard deviations of the login scores requires calculation 40 of the score S and the average of scores S stored in the enrollment process and subsequently updated, and the standard Deviation of S based on the new score S that was calculated as described above 42, and deleting 50 stored pattern data used to calculate the S score.

Cloud authentication processing provides a combination of login accuracy in the realm of using multifactor authentication of keystroke biometrics, device identification, and geographical-location based identification in relationship to the latency of login delay time because of the mathematical computation involved in processing millions of users over the Internet to access remote computer systems. This method of cloud authentication processing creates the highest known efficacy of end user login accuracy in relationship to end user login time to access remote computer systems.

embodiment of this method would save millions of dollars per data center in hardware equipment and an enormous amount of natural resources needed by companies, organizations and countries globally to power and cool this equipment without this cloud authentication processing approach.

|  | Estimation (High End) | CAP estimate | Remarks |
|---|---|---|---|
| Unique users | 750,000,000 | 750,000,000 |  |
| KB/record | 15 | 10 | 15 Kb to capture keystroke, device and Geo ID. CAP process stores only 10 Kb |
| Records per user | 15 | 1 | This number is dependent on the upper max set in the admin configuration |
| Assuming 15% of the users going through Password resets and Background process archiving | 112,500,000.00 | 12,500,000,00 |  |
| KB of data | 194,062,500,000 | 8,625,000,000 |  |
| Daily average logins | 187,500,000 | 187,500,000 | 4:1 ratio of logins based on 750 Million unique users |
| KB per record | 15 | 7 | After the upper max is reached only Transaction log will be filled with the incoming data. No more additions in UserAttribute table |
| Daily increase in data records | 2812500000 | 1312500000 |  |
| KB in a GB | 1,048,576 | 1,048,576 |  |
| GB | 185072.422 | 8225.440979 | Static load |
| GB | 2682.209015 | 1251.69754 | Daily increase in load |
| days in a month | 30 | 30 |  |
| GB/Month | 265538.6925 | 45776.36719 |  |
| GB in TB | 1000 | 1000 |  |
| TB/Month | 265.5386925 | 45.77636719 | Savings of 5.8 times more efficient |

Assumes data is stored online for a month

Cloud authentication processing of one embodiment of the present invention supports the global movement for green technologies. As systems move from behind corporate firewalls and into massive cloud based data centers, designed to encompass the art of green design and architecture, the implementation and usage of cloud authentication processing enables the data center to decrease the amount of electrical power, HVAC, and systems needed to process multifactor based authentication of end-user identity using keystroke biometrics, device identification, and geographical-location based identification.

The size of the problem being solved in the current embodiment of cloud authentication processing green approach is an estimated ratio of 6:1, that is to say that in order to compute, process, transact and store data on the scale of 750 million users globally, as is the estimated user count of the company called Facebook, the storage capacity needed is roughly 265 terabytes of storage per month. With database storage comes a host of computer servers, devices, routers, and switches as well as a host of interdependent hardware, all of which consume electrical power and HVAC resources needed to maintain a steady state and uptime of this equipment. The cloud authentication processing green approach envisioned would decrease this storage amount to just 45 terabytes per month.

Using embodiments of the cloud authentication processing method described herein dramatically decreases this consumption because cloud authentication processing only requires one attribute string 8-10 kilobytes and a mathematical computation against a single stored instance of a prior end-user's login data, mathematics and attributes. Thus the One embodiment of the present invention provides a system for the identification of users, the system comprising: an enrollment processor, whereby initial login attempts by the user are measured, and data identifying the user are collected for a specific device and location; the enrollment processor being configured to collect the identifying data and create a first login score, an iterative average login score, and an iterative standard deviation of the login score; an enrolled login processor, the enrolled login processor being configured to measure dwell time on keys in a login sequence and to calculate weighted dwell time from the dwell time; a login score calculator, the calculator taking the weighted dwell time and generating an actual login score; a login confidence comparator, the login confidence comparator comprising a processor whereby a comparison score is generated as a function of the actual login score, the iterative average login score, and the iterative standard deviation of the login score.

In such an embodiment the enrolled login processor may be further configured to measure flight time between the keys in the login sequence and to calculate weighted flight time from the flight time; and wherein the login score calculator is configured to take the weighted flight time and the weighted dwell time to generate an actual login score.

Such an embodiment may include an updater, whereby the iterative average login score and iterative standard deviation are updated after each login, and data used in calculating the login score is deleted and may provide a system wherein the confidence login generator identifies login attempts exceeding a desired degree of identity confidence and allows access to users making the login attempt. The weighted flight time may be $y_i$ where $W_f$ is a flight time weight, fi is a flight time for the $i^{th}$ key, $\bar{f}_i$ is an average flight time for the ith key, $\sigma_{f_i}$ is the standard deviation of $f_i$ and $$y_i = \text{Minimum}\left[W_f \frac{|f_i - \overline{f}_i|}{\sigma_{f_i}}, 1\right]$$

wherein $W_f=0.04$, but may be set to any other value, including zero. Similarly, weighted dwell time may be $x_i$ where $W_d$ is a dwell time weight, $d_i$ is a dwell time for the $i^{th}$ key, $\overline{d}_i$ is an average dwell time for the $i^{th}$ key, $\sigma_{d_i}$ is the standard deviation of $d_i$ and $$x_i = \text{Minimum}\left[W_d \frac{|d_i - \overline{d}_i|}{\sigma_{d_i}}, 1\right].$$

An even further embodiment of the present invention provides such a system wherein $W_d=0.20$, but may also be adjusted to weight the dwell time either more or less relative to the flight time.

In one embodiment of the present invention a system wherein the actual login score may be give as S wherein $$S = \sum_{i=1}^{k} x_i + \sum_{i=1}^{k-1} y_i$$

wherein $x_i$ is a dwell time score for an $i^{th}$ key and $y_i$ is a flight time for an $i^{th}$ key, and k is the number of keystrokes entered. The comparison score may be Z wherein $\overline{S}$ is an average S and $\sigma_s$ is a standard deviation of S and $$Z = \frac{S - \overline{S}}{\sigma_S}.$$

In one embodiment, the method includes collecting enrollment data from the user including dwell times for each of an enrollment series of login attempts; creating an iterative unified identification score for the user from the dwell times of the enrollment series of login attempts; establishing an iterative average of the iterative unified identification score; establishing an iterative standard deviation of the iterative unified identification score; deleting the dwell times of the enrollment series of login attempts; prompting the user to login and collecting login specific dwell times; calculating a login identification score from the login specific dwell times; comparing the login identification score to the iterative unified identification score, and if the login identification score is consistent with the iterative unified identification score allowing access to the user; and updating the iterative unified identification score, the iterative average of the unified identification score and the iterative standard deviation of the unified identification score. It should be noted that the terms "iterative" and "rolling" are used to convey that the values thus indicated are updated with the values of successive login attempt and then the new updated value is used the next calculation.

Such a method may also include collecting flight times for each of the enrollment series of login attempts wherein the creating the iterative unified identification login score uses the flight time of the enrollment series of the login attempts; deleting the flight time of the enrollment series of login attempts.

Such an embodiment may incorporate calculating averages and standard deviations of the dwell time for each of an enrollment series of login attempts.

In one embodiment, the first unified identification score is a function of the averages and standard deviations of the dwell time for each of an enrollment series of login attempts. In one embodiment the login identification score is a function of the login specific dwell times.

Even another embodiment of the present invention provides such a method wherein the comparing the login identification score to the iterative unified identification score comprises calculating a confidence score, the confidence score being a function of the login identification score, the average of the login identification scores and the standard deviation of the login identification scores.

The collecting enrollment data in one embodiment comprises prompting a user for a series of calibration login attempts, detecting flight and dwell times, from the series of calibration login attempts, calculating starting average dwell times, starting average flight times, starting standard deviation dwell times, and starting standard deviation flight times.

In one embodiment of the present invention the iterative unified identification score is first calculated from the starting average dwell times, starting average flight times, starting standard deviation dwell times, and starting standard deviation flight times.

In such an embodiment of the present invention the iterative unified identification score can be calculated from a series of identification scores derived from score enrollment login attempts following the calibration login attempts and score enrollment login attempts can include at least three score enrollment login attempts.

One embodiment of the present invention provides a method of identifying a user, the method including identifying if the user is enrolled; if the user is not enrolled, enrolling the user by prompting the user to enter a system access credential, updating a login count, and collecting dwell and flight time data over a plurality of calibration entries, using the calibration entries to calculate starting averages and standard deviations of the dwell and flight time data, deleting the dwell and flight time data; prompting the user to enter a series of score calculation entries and updating the login count; collecting dwell and flight time data from each score calculation entry in the series of score calculation entries; calculating an identification score for each entry of the series of score calculation entries from the dwell and flight time data of each the score calculation entry; calculating an rolling average and rolling standard deviation of the identification scores and updating the averages and standard deviations of the dwell and flight time data with the dwell and flight time data of each the score calculation entry to create rolling average dwell and flight times and rolling standard deviations of dwell and flight times; if the user is enrolled, prompting the user for the system access credential in an access login attempt; collecting dwell and flight time data of the access login attempt; calculating the identification score from the dwell and flight time data from the access login attempt, the rolling average dwell time, the rolling average flight time, the rolling standard deviation dwell time and the rolling standard deviation flight time; comparing the identification score to the rolling average identification score and the rolling standard deviation identification score, if identification score is within preset parameters, allowing access to the system, updating the rolling average dwell time, the rolling average flight time, the rolling average identification score, the rolling standard deviation dwell time, the rolling standard deviation flight time, the login count, and the standard deviation identification score.

One embodiment of the present invention may include the identification of a user may include generating an identification score based on dwell time of a login attempt; comparing the identification score against a stored average identification score and a standard deviation identification score.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for the identification of users, the system comprising:
   an enrollment processor, whereby initial login attempts by said user are measured, and identifying data is collected;
   said enrollment processor being configured to collect said identifying data and create a first login score, an iterative average login score, and an iterative standard deviation of said login score;
   an enrolled login processor, said enrolled login processor being configured to measure dwell time on keys in a login sequence and to calculate weighted dwell time from said dwell time;
   a login score calculator, said calculator taking the weighted dwell time and generating an actual login score;
   a login confidence comparator, said login confidence comparator comprising a processor whereby a comparison score is generated as a function of said actual login score, said iterative average login score, and said iterative standard deviation of said login score; and
   a login data storage component configured to store between login attempts only an iterative average dwell time, an iterative average flight time, said iterative average login score and said iterative standard deviation.

2. The system of claim 1 wherein said enrollment processor, login processor, login score calculator, login confidence comparator, and login data storage component are alterably configured to allow customized collection, calculation, comparison, and storage of data according to user needs.

3. The system of claim 1 wherein device attributes are scored against matched stored data consistent with stored information indicative of the hardware, software and communication protocols through which said system is accessed.

4. The system of claim 3 wherein weight assigned to device attributes is selected, based on previous data collected.

5. The system of claim 1 wherein weight assigned to said dwell time and weight assigned to said flight time is selected, based on previous data collected.

6. A method for the identification of a user of a system, the method comprising:
   collecting enrollment data from said user including dwell times for each of an enrollment series of login attempts;
   creating an iterative unified identification score for said user from said dwell times of said enrollment series of login attempts;
   establishing an iterative average of said iterative unified identification score;
   establishing an iterative standard deviation of said iterative unified identification score;
   deleting said dwell times of said enrollment series of login attempts;
   prompting said user to login and collecting login specific dwell times;
   calculating a login identification score from said login specific dwell times;
   comparing said login identification score to said iterative unified identification score, and if said login identification score is consistent with said iterative unified identification score allowing access to said user;
   and updating said iterative unified identification score, said iterative average of said unified identification score and said iterative standard deviation of said unified identification score and storing between login attempts in a login data storage component only an iterative average dwell time, an iterative average flight time, said unified identification score and iterative standard deviation of said unified identification score.

7. The method of claim 6 further comprising collecting measured login data, whose iterative average and standard deviation are stored for scoring, but are themselves deleted.

8. The method of claim 6 further comprising: scoring additional data derived exclusively from measured flight and dwell times.

9. The method of claim 6 wherein collecting enrollment data comprises measuring and recording relevant user statistics.

10. A method of identifying a user, said method comprising:
    identifying if said user is enrolled;
    if said user is not enrolled, enrolling said user by
      prompting the user to enter a system access credential, updating a login count, and collecting dwell and flight time data over a plurality of calibration entries,
      using said calibration entries to calculate starting averages and standard deviations of said dwell and flight time data, deleting said dwell and flight time data;
      prompting said user to enter a series of score calculation entries and updating said login count;
      collecting dwell and flight time data from each score calculation entry in said series of score calculation entries;
      calculating an identification score for each entry of said series of score calculation entries from said dwell and flight time data of each said score calculation entry;
      calculating an rolling average and rolling standard deviation of said identification scores and updating said averages and standard deviations of said dwell and flight time data with said dwell and flight time data of each said score calculation entry to create rolling average dwell and flight times and rolling standard deviations of dwell and flight times;
    if said user is enrolled, prompting said user for said system access credential in an access login attempt;
      collecting dwell and flight time data of said access login attempt;
      calculating said identification score from said dwell and flight time data from said access login attempt, said rolling average dwell time, said rolling average flight time, said rolling standard deviation dwell time and said rolling standard deviation flight time;
      comparing said identification score to said rolling average identification score and said rolling standard deviation identification score, if identification score is within preset parameters, allowing access to said system, updating said rolling average dwell time, said rolling average flight time, said rolling average identification score, said rolling standard deviation dwell time, said rolling standard deviation flight time, said login count, and said standard deviation identification score.

* * * * *